US010740482B2

(12) United States Patent
Kulkarni et al.

(10) Patent No.: US 10,740,482 B2
(45) Date of Patent: Aug. 11, 2020

(54) METHOD FOR SHARING MULTIPLE DATA ITEMS USING A SINGLE URL

(71) Applicant: Pro Softnet Corporation, Calabasas, CA (US)

(72) Inventors: Raghavendra Kulkarni, West Hills, CA (US); Vilabh Mishra, Glendale, CA (US); Diganta Dutta, Woodland Hills, CA (US); Gaurav Sanghavi, Calabasas, CA (US); Ajit Sirohi, Calabasas, CA (US); Nicholas DeVos, Calabasas, CA (US)

(*) Notice: Subject to any disclaimer, the term of this patent is extended or adjusted under 35 U.S.C. 154(b) by 0 days.

(21) Appl. No.: 15/019,953

(22) Filed: Feb. 9, 2016

(65) Prior Publication Data

US 2016/0162700 A1    Jun. 9, 2016

Related U.S. Application Data

(63) Continuation of application No. 13/740,160, filed on Jan. 12, 2013, now Pat. No. 9,286,644.

(51) Int. Cl.
| | | |
|---|---|---|
| *G06F 21/62* | (2013.01) | |
| *G06F 16/00* | (2019.01) | |
| *G06Q 10/10* | (2012.01) | |
| *G06F 40/134* | (2020.01) | |
| *G06Q 50/00* | (2012.01) | |
| *H04L 29/06* | (2006.01) | |

(52) U.S. Cl.
CPC .......... *G06F 21/6218* (2013.01); *G06F 16/00* (2019.01); *G06F 21/62* (2013.01); *G06F 40/134* (2020.01); *G06Q 10/101* (2013.01); *G06Q 50/01* (2013.01); *H04L 63/10* (2013.01)

(58) Field of Classification Search
CPC .. G06F 21/6218; G06F 17/2235; G06F 21/62; G06F 16/00; H04L 63/10; G06Q 10/101; G06Q 50/01
See application file for complete search history.

(56) References Cited

U.S. PATENT DOCUMENTS

| | | | | |
|---|---|---|---|---|
| 5,951,636 A * | 9/1999 | Zerber | ..................... | H04L 51/00 709/202 |
| 8,645,466 B2 * | 2/2014 | Motes | ................... | G06F 3/0482 709/204 |
| 9,361,313 B2 * | 6/2016 | Kaasten | ................ | G06F 16/284 |
| 2003/0101445 A1 * | 5/2003 | Li | ....................... | G06F 9/44521 717/170 |
| 2005/0188022 A1 * | 8/2005 | Hanson | .................. | G06Q 30/00 709/206 |

(Continued)

OTHER PUBLICATIONS

NPL Search (InnovationQ) (Year: 2020).*

*Primary Examiner* — Mahfuzur Rahman
*Assistant Examiner* — Richard W Cruz-Franqui

(57) ABSTRACT

A way of sharing a set of data where each data item is stored at a different file path. The data items may be files or folders that reside on different remote storage servers or within the same file system. One or more data items in the set of data do not share a common root folder. Data items in the set of data that share a common root folder are stored amongst other data items in the common root folder that do not belonging to the set of data items to be shared. A single URL or link is generated to provide immediate access to the set of data to recipients of the URL or link.

11 Claims, 9 Drawing Sheets

(56) References Cited

U.S. PATENT DOCUMENTS

| | | | |
|---|---|---|---|
| 2005/0188360 A1* | 8/2005 | de Jong | G06Q 20/341 |
| | | | 717/136 |
| 2006/0179083 A1* | 8/2006 | Kulkarni | G06F 11/1451 |
| 2006/0206547 A1* | 9/2006 | Kulkarni | G06F 11/1451 |
| 2006/0218482 A1* | 9/2006 | Ralston | H03M 7/40 |
| | | | 715/201 |
| 2007/0299932 A1* | 12/2007 | Kulkarni | G06Q 30/0241 |
| | | | 709/217 |
| 2008/0177994 A1* | 7/2008 | Mayer | G06F 9/4418 |
| | | | 713/2 |
| 2008/0294525 A1* | 11/2008 | Walk | G06Q 30/02 |
| | | | 705/14.64 |
| 2009/0165140 A1* | 6/2009 | Robinson | G06F 21/10 |
| | | | 726/26 |
| 2009/0307086 A1* | 12/2009 | Adams | G06F 16/9562 |
| | | | 705/14.49 |
| 2009/0327904 A1* | 12/2009 | Guzak | G06F 3/0482 |
| | | | 715/738 |
| 2012/0290842 A1* | 11/2012 | Artishdad | H04L 67/108 |
| | | | 713/168 |
| 2012/0296970 A1* | 11/2012 | Goto | H04L 67/06 |
| | | | 709/204 |
| 2012/0331108 A1* | 12/2012 | Ferdowsi | H04L 67/06 |
| | | | 709/219 |
| 2013/0136253 A1* | 5/2013 | Liberman Ben-Ami | |
| | | | H04M 3/5191 |
| | | | 379/265.09 |
| 2013/0262392 A1* | 10/2013 | Vibhor | G06F 16/178 |
| | | | 707/654 |
| 2014/0067865 A1* | 3/2014 | Kirigin | H04L 63/10 |
| | | | 707/783 |
| 2016/0321744 A1* | 11/2016 | Bowers | G06Q 40/02 |

* cited by examiner

600

| Share ID | Owner | Path | Key |
|---|---|---|---|
| 605 — share_id_1234 | johnson@email.com | Home > My Files > Docs | AF765 |
| 610 — group_share_id_5678 | smith@email.com | (null) | GG882 |
| 615 — share_id_8910 | smith@email.com | Home > Photos — 310 | (null) |
| 620 — share_id_3456 | smith@email.com | Home > notes.pdf — 315 | (null) |
| 625 — share_id_1254 | smith@email.com | Home > presentation.pptx — 320 | (null) |
| ... | ... | ... | ... |

| Group ID | Share ID | No. of Files | Type |
|---|---|---|---|
| group_share_id_5678 | share_id_8910 | 3 | Folder |
| group_share_id_5678 | share_id_3456 | 3 | File |
| group_share_id_5678 | share_id_1254 | 3 | File |
| ... | ... | ... | ... |

Fig. 7

METHOD FOR SHARING MULTIPLE DATA ITEMS USING A SINGLE URL

CROSS-REFERENCE TO RELATED APPLICATIONS

This application is a continuation of U.S. patent application Ser. No. 13/740,160, filed on Jan. 12, 2013.

BACKGROUND

A typical user of electronic devices may store data files at a variety of different places including hard drives on personal computers, transportable media such as CD's, DVDs, USB storage devices and portable hard drives, as well as on remote storage devices accessible using the Internet, often referred to as the "cloud". When users want to share these files with others, they have customarily made copies of the files and provided them on a transportable media or uploaded copies of the files electronically as an attachment to an email message.

With the expansion of cloud based services and social networks, new ways to share information have evolved (e.g. public and private online posts), but the sharing of actual data items is still done in a traditional manner where all the data must be present at a common location. For example, sharing data that is stored in the cloud is done in conjunction with emails or social contacts where, once a remote data item is selected, options are provided to share the data item via email or social networks. After a file or folder is shared with one or more recipients, the recipients typically receive a share link in the form of a uniform resource locator (URL) that references the shared file or root folder on the remote server. Clicking on the URL may direct the recipient to a web page that displays the shared data items for viewing and downloading or the link may be a direct download link to download the shared data item to the recipient's computing device.

When a user wants to share several files in a single share URL, the user is typically required to move all desired files to a single folder or compress all the files into a single archive file (e.g., .zip or .rar). Accordingly, to share multiple files, folders, or a combination of files and folders requires duplication of all data items in a compressed archive or grouping the data items by moving them into a single common root folder in order to allow the user to make a single data item selection. If multiple files and folders are not grouped together in this manner then multiple share links are needed, one for each data item, because each data item would not share a common root file path. Thus, the prior art is limited to one share link or URL per root file path where the recipient would have access to all files residing within the root file path (e.g. a shared folder with several data items).

For these reasons, there exists a need for a solution that allows a user to share several selections of data items, regardless of path location and without requiring grouping or moving of the data items, and provides a single share URL that makes all the data items available to the intended share recipient(s) at once.

SUMMARY

Some embodiments provide a way to share multiple, ungrouped data items (e.g., files and folders of files) using a single share link or URL. Some of these embodiments may allow a user to make a selection of several files, folders, or a combination of files and folders that do not share a common root file path to be shared among a set of recipients. The shared data may be stored on one or more remote storage servers which may span one or more remote storage service providers. Different files may be shared in different ways, as appropriate. For instance, a set of authorized persons (or authorized users) may be designated for each shared file or for the entire set of shared data. In addition, some embodiments may provide a shared file repository (e.g., a folder) that allows multiple users to upload, download, modify, update, and/or otherwise manipulate files within the shared file repository. Such shared data may be stored in a secure way (e.g., the shared data may be stored in an encrypted form).

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGs.") that are referred to in the Detailed Description will further describe exemplary embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

FIG. 6 illustrates an exemplary share info table according to one embodiment of the present invention;

FIG. 7 illustrates an exemplary group share table according to one embodiment of the present invention;

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed and using different embodiments without departing from the spirit or scope of the invention.

Figure 1:
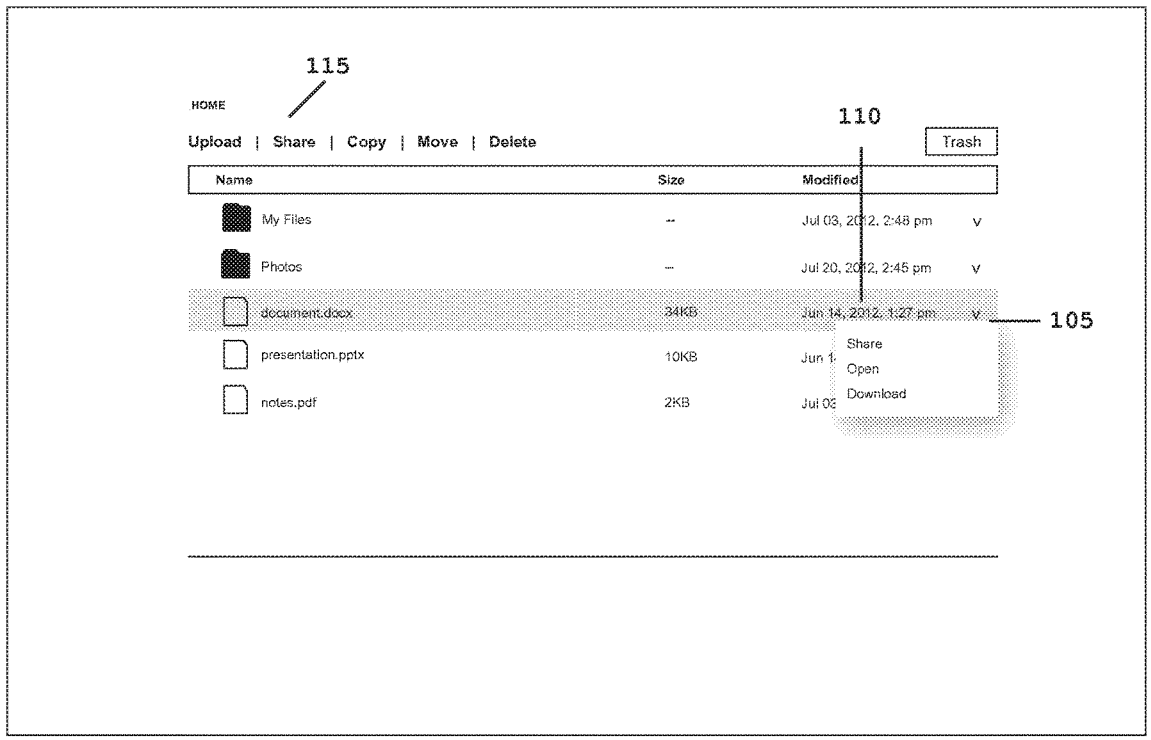
FIG. 1 illustrates the prior art for sharing a data item.

FIG. 1 illustrates the prior art method of sharing a single data item (e.g., a data file or a folder containing data file(s) and/or child folders) that is stored on a remote storage area. As shown, each data may have a context menu 105 that includes a share command 110, a share function 115, or a similar create link command. Invoking the share command 110 or share function 115 for a particular data item allows the user to create a share link or URL that points to the location where that particular data item is stored so a recipient can view or download the shared file.

Figure 2:
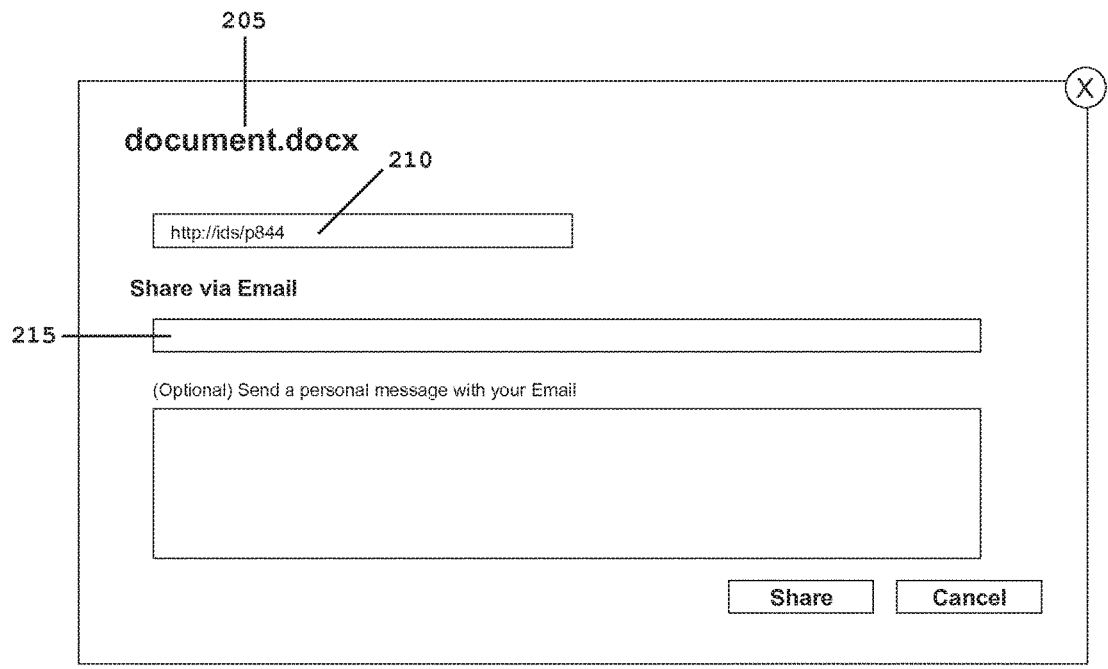
FIG. 2 illustrates a sharing operation of a data item.

FIG. 2 illustrates the share operation for the identified file 205. As illustrated, a share link may 210 be provided for copying, and an e-mail address and/or social contact entry filed 215 may be provided so the link can be electronically communicated to the intended recipients.

Figure 3:
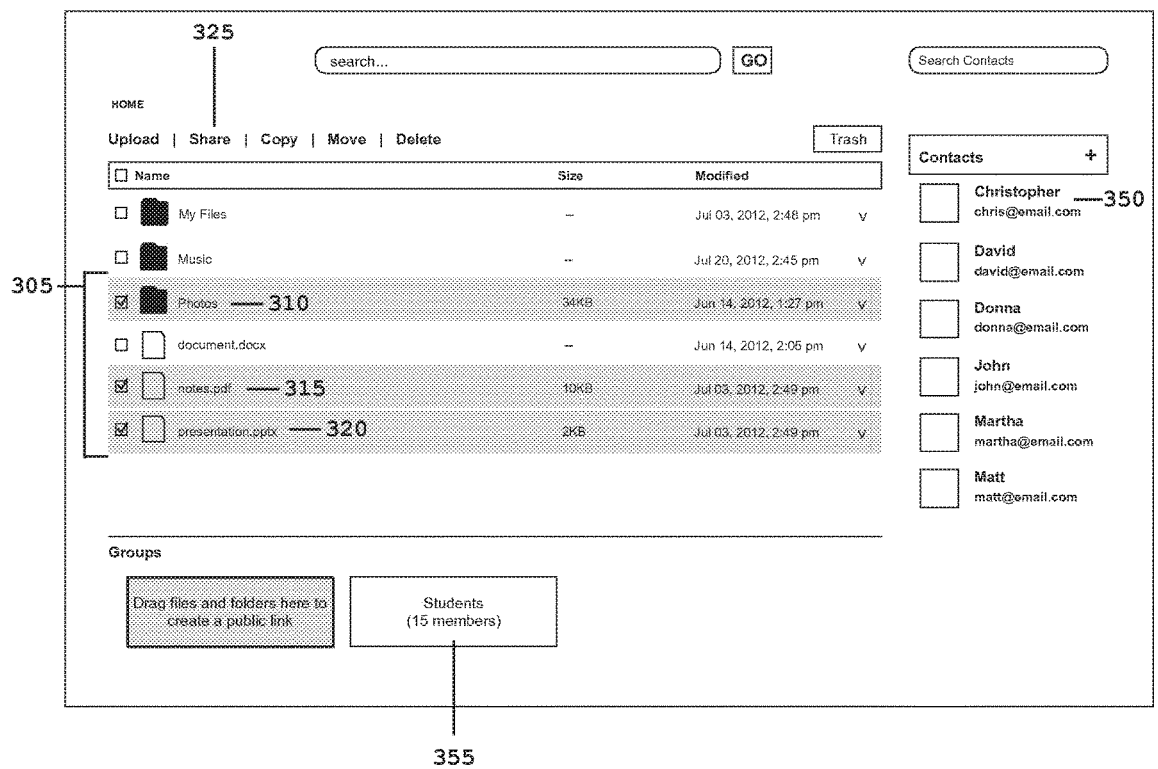
FIG. 3 illustrates the selection of multiple data items for sharing according to one embodiment of the present invention.

FIG. 3 illustrates a graphical user interface displaying remotely stored data 305 where a selection of three data items has been made, namely one folder 310 and two files 315 and 320. In some embodiments of the present invention, a selection of multiple data items may be made in various child folders and parent folders, where all selections are maintained while the user IS navigating and selecting several data items throughout the file system of the remote storage. Each data item may be defined with a unique path where the identified paths may not share a common root folder. If a common root folder is shared, several other files may be present in the same common root folder that are not part of selected set of data items, thus the common root folder cannot be fully shared with a recipient if the user wishes to keep certain files in the common root folder private an exclusive of the shared data.

Once the user has selected all the desired data items to define a set of data, the user may invoke a share command by (i) selecting a share command from a context menu, (ii) selecting a share command button 325, (iii) by dragging and dropping the set of data items onto an individual contact 350 or a group of contacts 355, or by any other similar sharing command. After a share command is invoked, some embodiments may present the user with a screen to enter email address(es) or social contact(s) from one or more social networks as illustrated in FIG. 2. Other embodiments may provide a confirmation window 405 as illustrated in FIG. 4.

Figure 4:
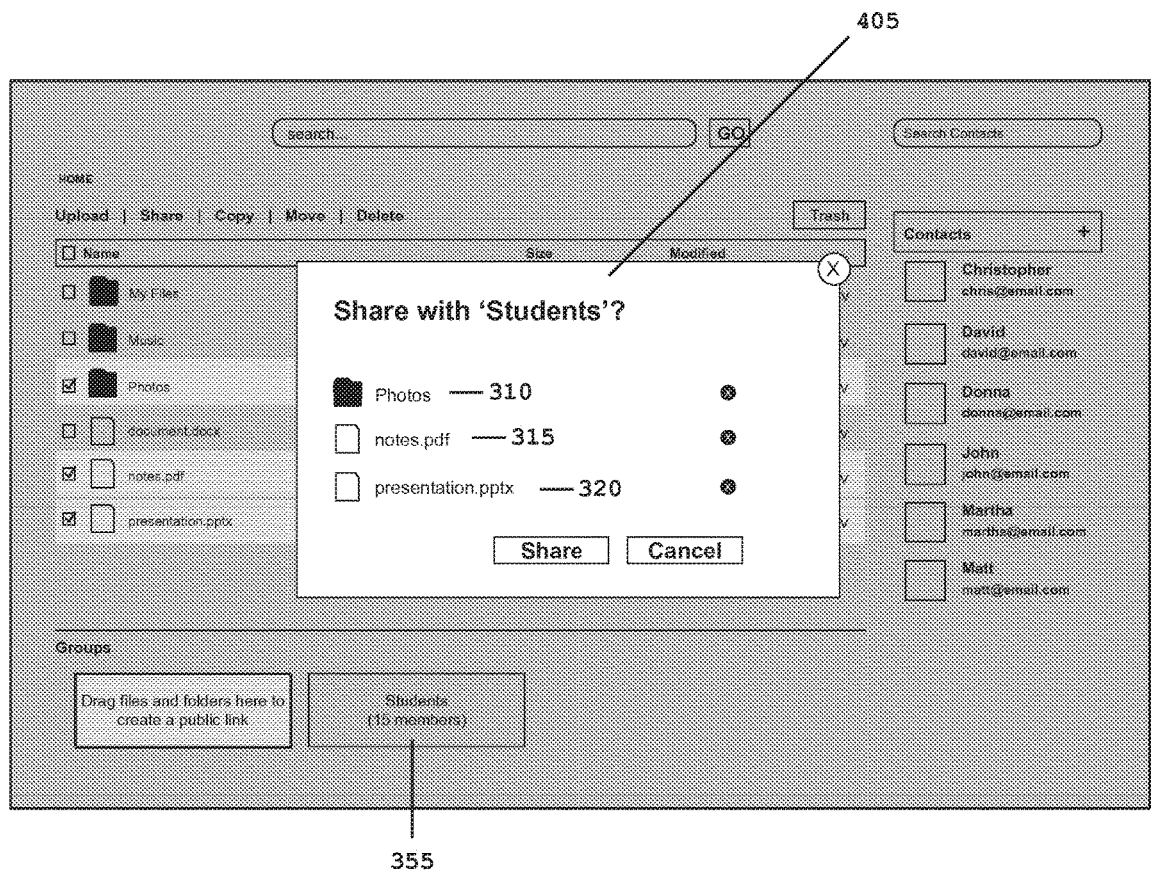
FIG. 4 illustrates an exemplary confirmation screen for sharing multiple data items with a group of recipients.

In FIG. 4, the user has shared three selected data items 310, 315, and 320 with a share group 355. From the confirmation window 405 the user can review his data item selections for accuracy. Some embodiments may also provide the user with the ability to remove data items which may have been accidentally selected from within the confirmation window 405. Once the sharing of the set of data is confirmed by the user, a share link or URL is generated and electronically sent to the intended recipients identified by the user. The URL may then be used to immediately access the set of data via the Internet or a communications network.

Some embodiments may also provide the user with several options for managing each URL for the set of shared data. For example, the single share URL created for the set of data may be defined as a public URL or a private URL. Public URLs are usable by anyone possessing the link while private URLs may be linked to user accounts or social network accounts in order to authenticate authorized persons before allowing access to the set of data. Some embodiments may further provide the user with the ability to track which user has accessed, viewed, and/or downloaded the set of data for private links. Other embodiments may also provide the user with an option to limit the number of downloads for the set of data while some may provide options to terminate a URL at a specified date and time.

Figure 5:
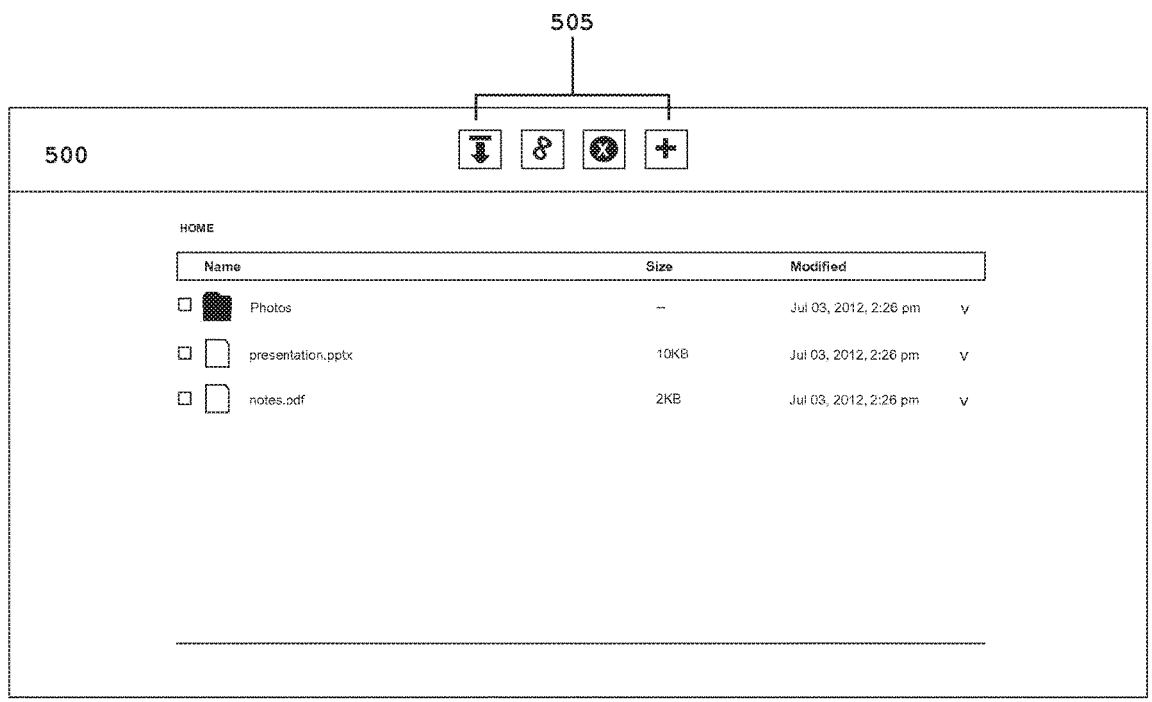
FIG. 5 illustrates a graphical user interface of some embodiments for displaying a set of data items shared with a single link.

FIG. 5 illustrates a graphical user interface 500 of some embodiments for displaying the set of data items to an intended recipient. From this interface the recipient may choose to view data items, download individual data items, download the set of data items in a compressed archive, or download a smaller selection, or sub-set of set of data items. The recipient may also have a several command operations 505 available, for example, a command to copy the single URL link for the set of data to his computer's clipboard. If the owner of the set of data accesses the same link while logged into his user account, the user may further be provided with a command to delete the URL link thus terminating access to the set of share data to each recipient of that URL. If proper permissions are allowed, the recipient or owner may also further share the same URL link with other email addresses or contacts from several other social networks.

To effectuate the sharing of data, a share info table 600 similar to the one illustrated in FIG. 6 may be maintained by a sharing module of a file management application or a remote data management application. As shown in FIG. 6, the share info table 600 has several entries 605, 610, 615, 620, and 625. Each shared data item, whether it is an individual share or a part of a set of data items, may be stored in the share info table. Each entry in the share info table may have fields that include a share ID, owner of the data item, path where the data item is located, and a unique key that is used to create a share link or URL, where the key identifies the particular shared data item to display to the share recipient.

Share data item 605 is an example of a single data item share that has a respective share ID, owner, path, and key. These components in conjunction identify a unique shared data item. Therefore, when a recipient uses a URL link having a particular key integrated into the URL, the recipient may be taken, for example, to a website that uses the key to identify which data item to display to the user.

Share data item 610 is an example of multi-data item share, where the multi-data item set has entries for a share ID, an owner, and a key. The path entered in the share info table when sharing a set of data may be left null because the set of data likely includes several data items where each data item has a separate and unique file path. For data items 310, 315, and 320 that belong to a multi-data item set 610, an entry 615, 620, and 625 in the share table will be made for each data item 310, 315, and 320 in the set of data items but the key filed for each data item will be left with a null entry.

In order to reconcile the data items that belong to a multi-data item share, a second table may be utilized. FIG. 7 illustrates an exemplary group share table 700 for such reconciliation. The group share table may include fields for a group share ID, an individual share ID, the number of files belonging to the particular group share ID, and a type field to indicate the type of data item (e.g., file or folder). Each data item belonging to a particular set of data items will have an entry in the group share table 700. As illustrated in FIG. 7, group share ID 5678 includes 3 data items and accordingly, there are 3 entries for group share ID 5678. Each entry may include the unique individual share IDs for each data item 310, 315, and 320 in the set of data items found in the share info table 600.

A data sharing application may then be able to provide a single unique URL to the set of data items by embedding the group share ID key of entry 610 from the share info table 600 within the URL. When a recipient uses the group share URL to view the set of data, the share module may recognize that a null field exists for the path entry in the share info table 600. The share module then knows to look to the group info table to reconcile which data items need to be displayed to the recipient for the identified group share ID. From the group share table, the share module can identify the number of data items to be displayed, find the individual unique share IDs of each data item in the set of data, and by linking the share info table and group share table, the share module can reconcile the path of each individual data item and display the set of data items on a single graphical user interface for a recipient to view, access and/or download.

With the ability to share data items having different, distinct and exclusive file paths, the same methods described above may be adapted to share data items that reside in different locations, which may include locations across several remote storage areas, local storage areas, and even different service provider storage areas. As long as a path can be defined for a particular data item, and that path is available and accessible via a URL, the data item may be included in a grouped share command. For instance, a third party service provider having remote storage may provide application programming interfaces (APIs) for linking to or downloading data items stored on the third party service provider's remote storage. If a user is able to make a selection of such a file that has an identifiable path to the data item, it may be included in the set of data items to be shared. The path of the data item would simply be entered in the share info table with a null entry in the key field. If a user makes a selection of a local file, then a secondary operation may be performed in some embodiments to upload that local data item to the sharing program's remote storage so an accessible URL path may be defined for that data item before it is included in the set of data items to be shared.

Figure 8:
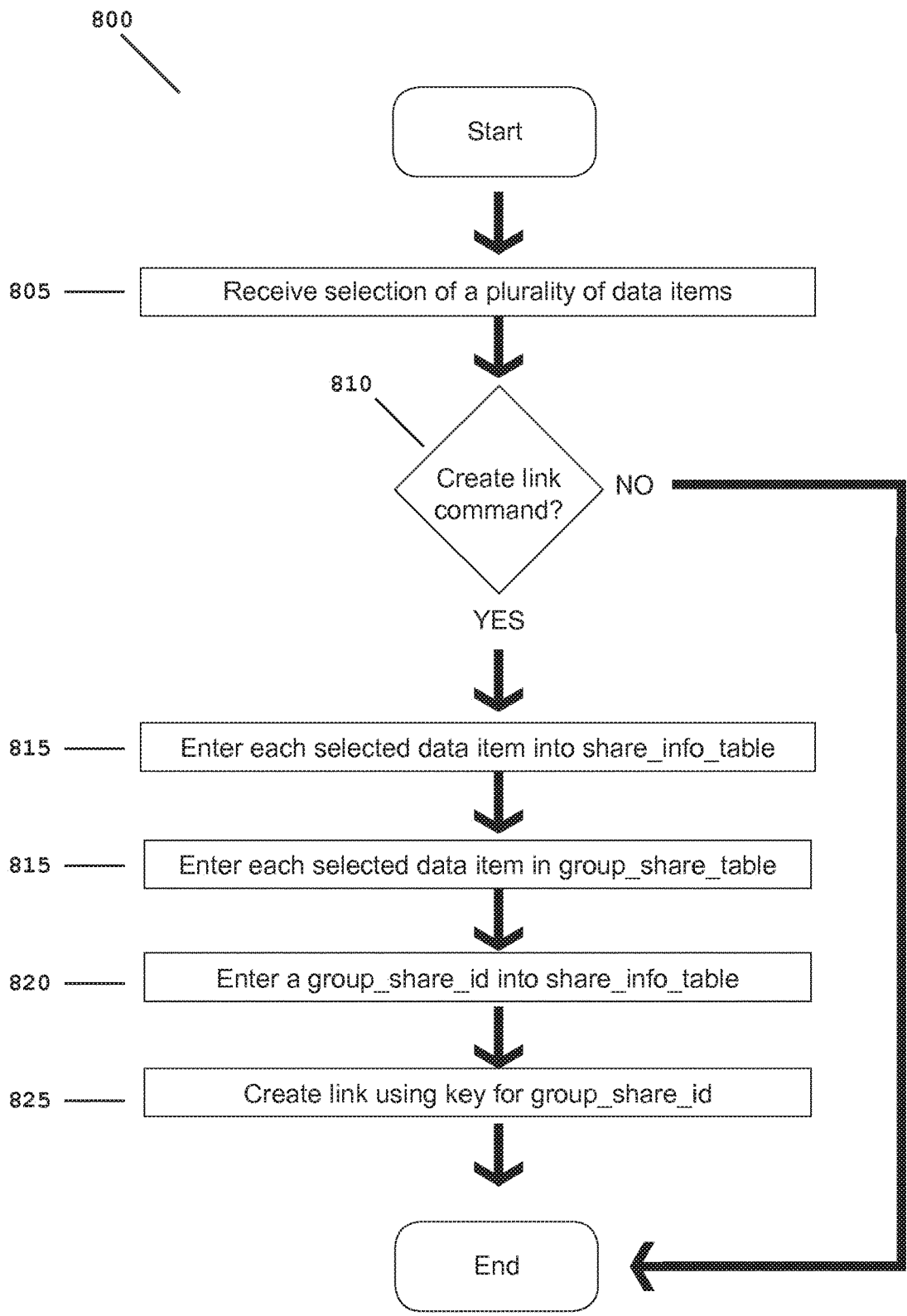
FIG. 8 illustrates a flow chart of a conceptual process used by some embodiments to share a set of data items.

FIG. 8 illustrates a flow chart of a conceptual process 800 used by some embodiments to share a set of data items. To effectuate the sharing of a set of data, one embodiment may first (at 805) receive a selection of plurality of data items. These data items may all reside on a single service provider's remote storage, a private remote storage, or across multiple storage areas. Once a set of data items has been selected, the process 800 may then receive a command to create a link. If a create link command is not received (at 810), the process ends. If (at 810) the process receives a command to create a single link to share the set of data, the process will then (at 815) enter each selected data item into the share info table of the share application program. Each entry for the set of data items will have a null value recorded in its respective key field, its respective path in the path field, and a uniquely generated individual share ID.

Next (at 815), the process will enter each selected data item in the group share table. Each entry will include a same group share ID as its respective unique individual share ID found in the share info table. Each entry may also be identified as a file or folder in order to allow the graphical user interface to properly display whether the date item is a single file or a folder having a common root path to several individual files. Then (at 820), an entry for the group share ID may be made in the share info table, where the group share ID has a null value recorded in its respective path field and a unique group key in the key field. Finally, the process (at 825) may use the uniquely generated group key and embed the group key into a single URL which can then be electronically communicated to a set of intended recipients.

One of ordinary skill in the art will recognize that process 800 may be performed in various appropriate ways without departing from the spirit of the invention. For instance, the process may not be performed as one continuous series of operations in some embodiments. Alternatively, the process may be repeated, continuously or at regular or irregular intervals, in some embodiments. In addition, the process may be implemented using several sub-processes, or as part of a larger macro-process. Furthermore, various processes may be performed concurrently, sequentially, or some combination of sequentially and concurrently. Moreover, the operations of the process may be performed in different orders.

Figure 9:
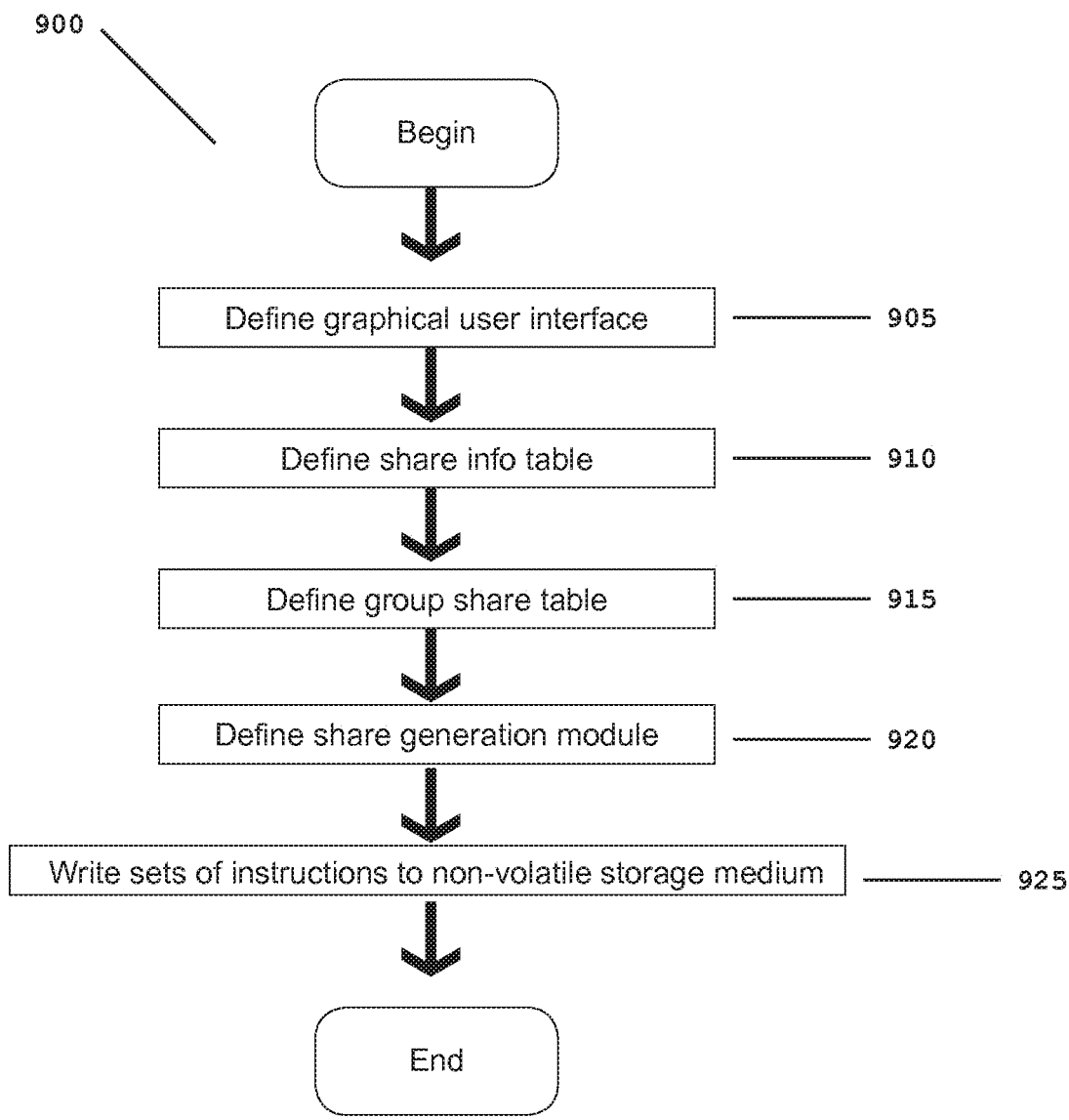
FIG. 9 illustrates a flow chart of a conceptual process used by some embodiments to define and store a share application of some embodiments.

FIG. 9 illustrates a flow chart of a conceptual process 900 used by some embodiments to define and store a share application program of some embodiments. Specifically, process 900 illustrates the operations used to define sets of instructions for providing several of the elements shown in FIG. 3-FIG. 8 and for performing various methods described above.

Process 900 may begin when a manufacturing facility generates a computer program product for use by consumers. As shown, the process may define (at 905) sets of instructions for implementing a graphical user interface similar to the one illustrated in FIG. 3. In some cases, such sets of instructions are defined in terms of object-oriented programming code. For example, some embodiments may include sets of instructions for defining classes and instantiating various objects at runtime based on the defined classes. The process may then define (at 910) sets of instructions for implementing a share info table (e.g., share info table 600 described above in reference to FIG. 6).

Next, process 900 may define (at 915) sets of instructions for implementing a group share table (e.g., group share table described above in reference to FIG. 7). Process 900 then may define (at 920) sets of instructions for implementing a share module for creating and electronically transmitting a unique URL associated with the set of data items being shared. Finally, the process may write (at 925) the sets of instructions to a non-volatile and non-transitory storage medium.

One of ordinary skill in the art will recognize that the various sets of instructions defined by process 900 are not exhaustive of the sets of instructions that could be defined and stored on a computer readable storage medium for a sharing application program incorporating some embodiments of the invention. In addition, the process 900 is a conceptual process, and the actual implementations may vary. For example, different embodiments may define the various sets of instructions in a different order, may define several sets of instructions in one operation, may decompose the definition of a single set of instructions into multiple operations, etc. In addition, the process 900 may be implemented as several sub-processes or combined with other operations within a macro-process.

Many of the processes and modules described above may be implemented as software processes that are specified as at least one set of instructions recorded on a non-transitory storage medium. When these instructions are executed by one or more computational elements (e.g., microprocessors, microcontrollers, Digital Signal Processors ("DSPs"), Application-Specific ICs ("ASICs"), Field Programmable Gate Arrays ("FPGAs"), etc.) the instructions cause the computational element(s) to perform actions specified in the instructions.

Figure 10:
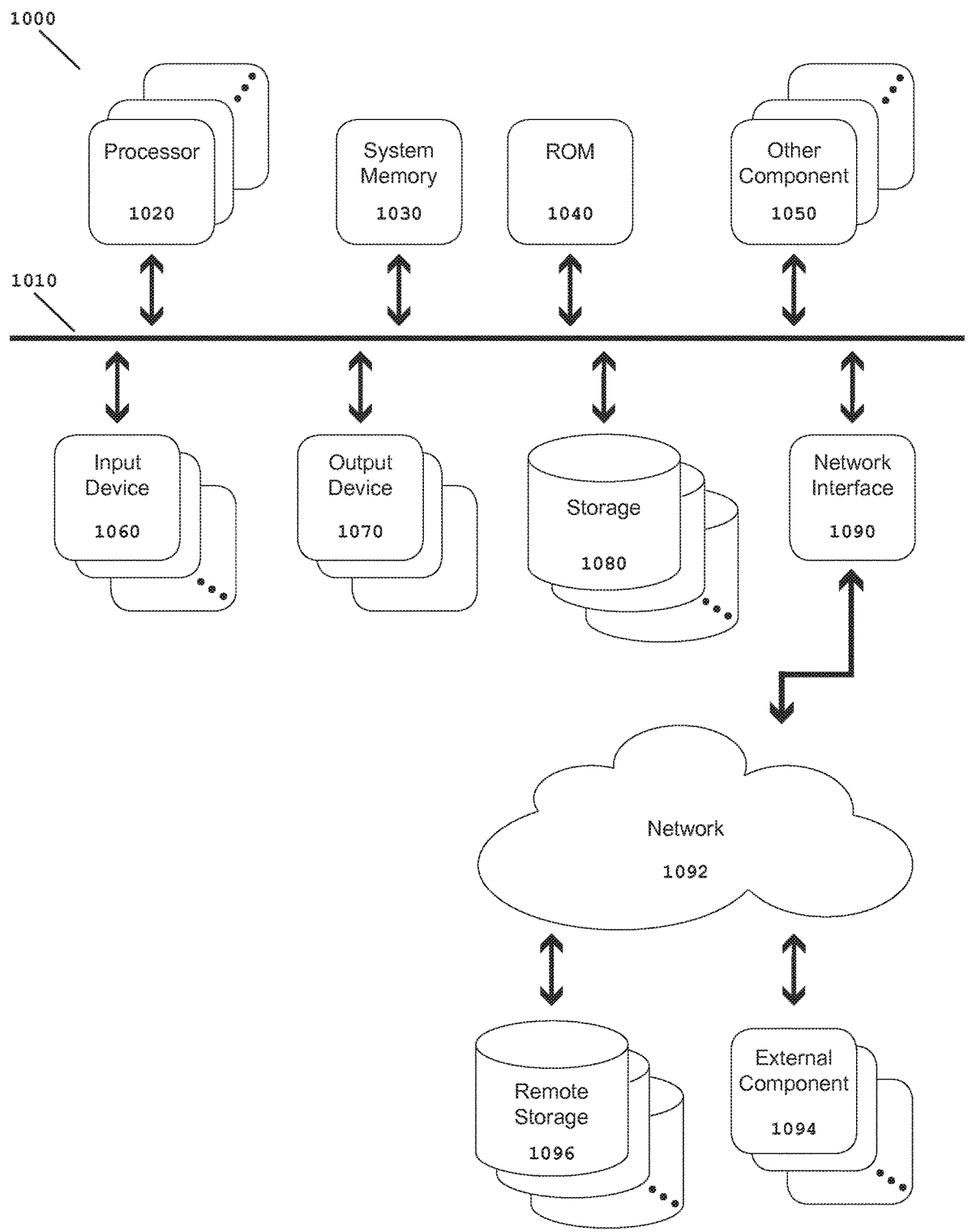
FIG. 10 illustrates a schematic block diagram of a conceptual computer system with which some embodiments of the invention may be implemented.

FIG. 10 illustrates a schematic block diagram of a conceptual computer system 1000 with which some embodiments of the invention may be implemented. For example, the sharing module described above may be at least partially implemented using computer system 1000. As another example, the processes described in reference to FIG. 9 may be at least partially implemented using sets of instructions that are executed using computer system 1000.

Computer system 1000 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 1000 may include a bus 1010, at least one processing element 1020, a system memory 1030, a read-only memory ("ROM") 1040, other components (e.g., a graphics processing unit) 1050, input devices 1060, output devices 1070, permanent storage devices 1080, and/or a network connection 1090. The components of computer system 1000 may be electronic devices that automatically perform operations based on digital and/or analog input signals. For instance, the various example share modules described may be at least partially implemented using sets of instructions that are run on computer system 1000.

Bus 1010 represents all communication pathways among the elements of computer system 1000. Such pathways may include wired, wireless, optical, and/or other appropriate communication pathways. For example, input devices 1060 and/or output devices 1070 may be coupled to the system 1000 using a wireless connection protocol or system. The processor 1020 may, in order to execute the processes of some embodiments, retrieve instructions to execute and data to process from components such as system memory 1030, ROM 1040, and permanent storage device 1080. Such instructions and data may be passed over bus 1010.

ROM 1040 may store static data and instructions that may be used by processor 1020 and/or other elements of the computer system. Permanent storage device 1080 may be a read-and-write memory device. This device may be a non-volatile memory unit that stores instructions and data even when computer system 1000 is off or unpowered. Permanent storage device 1080 may include a mass-storage device (such as a magnetic or optical disk and its corresponding disk drive).

Computer system 1000 may use a removable storage device and/or a destination storage device as the permanent storage device. System memory 1030 may be a volatile read-and-write memory, such as a random access memory ("RAM"). The system memory may store some of the instructions and data that the processor uses at runtime. The sets of instructions and/or data used to implement some embodiments may be stored in the system memory 1030, the permanent storage device 1080, and/or the read-only memory 1040. For example, the various memory units may include instructions for authenticating a client-side application at the server-side application in accordance with some embodiments. Other components 1050 may perform various other functions. These functions may include interfacing with various communication devices, systems, and/or protocols.

Input devices 1060 may enable a user to communicate information to the computer system and/or manipulate various operations of the system. The input devices may include keyboards, cursor control devices, audio input devices and/or video input devices. Output devices 1070 may include printers, displays, and/or audio devices. Some or all of the input and/or output devices may be wirelessly or optically connected to the computer system.

Finally, as shown in FIG. 10, computer system 1000 may be coupled to a network 1092 through a network adapter 1090. For example, computer system 1000 may be coupled to a web server on the Internet such that a web browser executing on computer system 1000 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1000 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

We claim:

1. A computer implemented method for sharing data comprising:

receiving a first selection of a first data item stored at a first file path;

receiving a second selection of a second data item stored at a second file path that is different than the first file path, wherein the first file path and second file path do not share a common root file path;

wherein each data item is one of (i) a data file and (ii) a data folder comprising one or more data items;

receiving a request to share the first selection and the second selection as a set of data items over an Internet connection with one or more recipients while maintaining the first file path of the first data item and the second file path of the second data item and without grouping or moving the first data item and the second data item into one of (i) a single folder or (ii) a single file; and creating a single uniform resource locator (URL) link that opens a web page displaying the set of data items and an option to allow the user to directly download the set of data items as a single archive file.

2. The method of claim 1, wherein the web page displaying the set of data items further comprises options to (i) view the data items, (ii) download individual data items, and (iii) download a user selected sub-set of the set of data items.

3. The method of claim 1, wherein the first data item and the second data item are stored on two different remote storage servers using two different service providers.

4. The method of claim 1, wherein the link is a private link that authenticates the recipient of the link before allowing access to the set of data items.

5. The method of claim 1, wherein the link is a public link accessible by any recipient in possession of the link.

6. The method of claim 1 further comprising electronically communicating the link to one or more recipients.

7. A non-transitory computer readable medium storing a data sharing application for execution by at least one processor, the data sharing application comprising sets of instructions for:
   receiving a first selection of a first data item stored at a first file path;
   receiving a second selection of a second data item stored at a second file path that is different than the first file path, wherein the first file path and second file path do not share a common root file path;
   wherein each data item is one of (i) a data file and (ii) a data folder comprising one or more data items;
   receiving a request to share the first selection and the second selection as a set of data items while maintaining the first file path of the first data item and the second file path of the second data item and without grouping or moving the first data item and the second data item into one of (i) a single folder or (ii) a single file; and
   creating a single Uniform Resource Locator (URL) for accessing the set of data items, wherein the URL provides the immediate access to the set of data items via an Internet connection.

8. The non-transitory computer readable medium of claim 7, wherein one or more data items are located at remote storage locations different from other data items in the set of data items.

9. The non-transitory computer readable medium of claim 7 further comprising sets of instructions for:
   receiving identifying information for a set of authorized persons having permission to access the URL; and
   transmitting, to each person in the set of authorized persons, the URL for accessing the set of data items.

10. The non-transitory computer readable medium of claim 9, wherein transmitting the URL occurs via a social network.

11. The non-transitory computer readable medium of claim 7, wherein two or more data items in the set of data items share a common root folder and the common root folder contains a plurality of other data items that are not selected.

* * * * *